Oct. 28, 1941.   H. A. RAPHAEL   2,260,401
WEIGHT INDICATOR
Filed Dec. 5, 1938
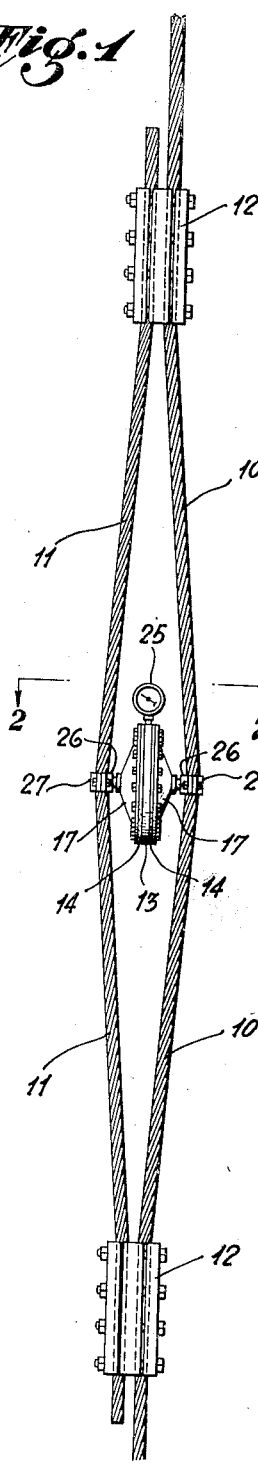
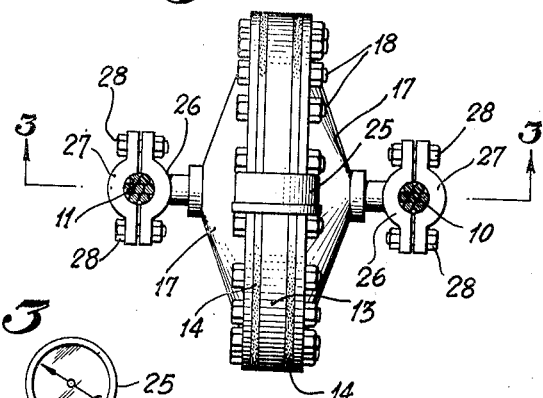
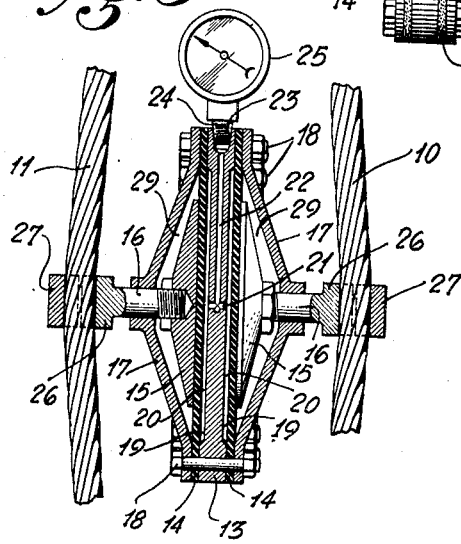
INVENTOR
HAROLD A. RAPHAEL
BY Robert M. McManigal
ATTORNEY Patented Oct. 28, 1941

2,260,401

UNITED STATES PATENT OFFICE 2,260,401

WEIGHT INDICATOR

Harold A. Raphael, Bellflower, Calif.

Application December 5, 1938, Serial No. 243,907

2 Claims. (Cl. 265—1.6)

This invention relates to weight indicators for determining the amount of weight or strain on a cable of the type disclosed in my co-pending application Ser. No. 168,814, filed October 13, 1937, which has matured into Patent No. 2,189,552, and is an improvement on the weight indicator disclosed in said application.

The main object of this invention is to provide a weight indicator in which changes in temperature have a minimum effect on the weight indicator diaphragm unit. I have found that in actual operation with conventional weight indicators for determining the load on the load-carrying cable of well drilling apparatus, in which the diaphragm unit is attached to the stationary end of the load-carrying cable and in which the indicating gauge is located next to the driller adjacent to the drawworks, without any weight on the conventional traveling block whatever, that the reading of the indicator gauge varies considerably depending upon the atmospheric conditions.

In the diaphragm unit disclosed in my above-mentioned co-pending application, the cylinder in which the fluid chambers are formed has a comparatively large peripheral surface which is not insulated and the temperature of the fluid in said chambers therefor varies substantially with the atmospheric temperature.

Another object of my invention is to provide a diaphragm unit which is both economical and convenient to manufacture.

My invention has many other objects, advantages, and features, some of which, with the foregoing, will be set forth at length in the following description where I shall outline certain forms of the invention, which I have selected for illustration in the drawing accompanying and forming a part of the present specification. In the said drawing, I have shown certain forms of my invention, but it is to be understood that I do not limit myself to such forms, since the invention, as expressed in the claims, may be embodied in a large plurality of forms.

Referring to the drawing:

Fig. 1 is a view illustrating the assembly of the invention.

Fig. 2 is a view taken on the line 2—2 of Fig. 1.

Fig. 3 is a view taken on the line 3—3 of Fig. 2.

The numeral 10 indicates a portion of a length of a load-carrying cable, such as a cable used as a part of well drilling apparatus for suspending the drilling tool. A suitable length of cable 11 is clamped to the cable 10 at spaced points in length by means of clamps 12. Interposed between the cables 10 and 11 intermediate the points of connection 12 is the diaphragm unit of my invention.

As clearly shown in Fig. 3, the diaphragm unit consists of a narrow center disc 13, diaphragms 14, deflection plates 15 provided with deflection plugs 16, and bonnets 17, which are secured together by means of bolts 18.

The center disc 13 may be constructed from a section of boiler plate and is preferably, but not necessarily, less than one inch in thickness, in order to provide a minimum of material which is subject to changes in atmospheric temperatures. The opposite sides of the disc are preferably hollowed out as indicated at 19 in order to provide for fluid chambers 20. The fluid chambers 20 are connected together by a transverse bore 21. A radial bore 22 communicates with transverse bore 21 and the outer end of said radial bore is threaded as indicated at 23. A nipple 24 is threaded into said radial bore 22 and communicates with a conventional fluid pressure gauge 25. The gauge 25 while shown closely positioned relative to the diaphragm unit may, as in actual practice, be located adjacent the drawworks or at any other point as desired.

As clearly shown in the drawing, the outer ends of the deflection plugs 16 may be provided with fixed clamp members 26. The deflection plugs 16 may be secured to the cable 10 and to the cable section 11, respectively, intermediate the points of connection 12 by means of complemental caps 27 and bolts 28.

In actual operation, one-half of the load will be carried by the cable 10 and the other half by the cable section 11. When weight is applied to the load carrying cable, the portions of the cables 10 and 11 between the points of connection 12 will move toward each other, thereby causing the deflection plates 15 to move toward the center disc, flexing the diaphragms 14, and forcing a portion of the fluid in the fluid chambers 20 to flow through the bores 21 and 22 to the gauge 25 to operate said gauge.

By reading the gauge 25, one may ascertain the amount of weight on the load carrying cable.

It can readily be seen that changes in atmospheric temperature will have a minimum effect on the fluid in the fluid chambers 20 and therefore a minimum effect on the reading of the weight indicator.

The outer sides of said fluid chambers 20 are protected against changes in temperature by the diaphragms 14, which are usually constructed of rubber or other non-conducting material. Air spaces, indicated by the numeral 29, are also provided between the bonnets 17 and the diaphragms 14, at all points other than the periphery of said members, which further protects the fluid chambers 20 against changes in temperature. The center disc 13, as noted above, is preferably less than one inch in thickness and therefore presents only a comparatively small peripheral surface which is exposed to the atmosphere.

From the foregoing description taken in connection with the accompanying drawing, the uses, advantages, and operation of the weight indicator of my invention will be readily understood by those skilled in the art to which the invention appertains. While I have described the principle of operation together with the forms of my invention which I now consider to be the best embodiment thereof, I desire to have it understood that the articles shown are merely illustrative and that the invention is not to be limited to the details disclosed herein, but is to be accorded the full scope of the appended claims.

I claim:

1. A weight indicator for load carrying cables comprising a narrow disk having a fluid containing chamber on each of its sides, a transverse bore in the disk connecting said fluid chambers, and a radial bore communicating with said transverse bore, a fluid pressure gauge communicating with said radial bore, a pair of flexible diaphragms on opposite sides of said disk forming the outer ends of said fluid chambers, bonnets on the outer sides of said flexible diaphragms, said bonnets being spaced from said diaphragms near the center of said diaphragms, forming an air space therebetween, a pair of deflection plates mounted in said bonnets and on opposite sides of said disk for movement inwardly against said diaphragms under pressure exerted against said deflection plates, and a stem on each of the deflection plates projecting outwardly through said bonnets to be pressed inwardly as a load is placed on the load carrying cable.

2. A weight indicator for load carrying cables comprising a narrow disk having a fluid containing chamber on each of its sides, a transverse bore in the disk connecting said fluid chamber, and a radial bore communicating with said transverse bore, a fluid pressure gauge communicating with said radial bore, a pair of flexible diaphragms on opposite sides of said disk, said diaphragms being formed of non-conducting material closing the outer ends of said chambers and extending over the entire area of the sides of said narrow disk, bonnets on the outer sides of said flexible diaphragms, said bonnets being adjacent the periphery of said diaphragms but spaced apart from said diaphragms near the center thereof forming an air space therebetween, a pair of deflection plates mounted in said bonnets and on opposite sides of said disk for movement inwardly against diaphragms under pressure exerted against said deflection plates, and a stem on each deflection plate projecting outwardly through said bonnets to be engaged by the load carrying element.

HAROLD A. RAPHAEL.